(12) United States Patent
Kobayashi

(10) Patent No.: US 6,955,764 B2
(45) Date of Patent: Oct. 18, 2005

(54) METHOD AND APPARATUS FOR PREPARING SLURRY FOR CMP APPARATUS

(75) Inventor: Shigeki Kobayashi, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 178 days.

(21) Appl. No.: 10/338,660

(22) Filed: Jan. 9, 2003

(65) Prior Publication Data

US 2003/0132168 A1 Jul. 17, 2003

(30) Foreign Application Priority Data

Jan. 11, 2002 (JP) .............................. 2002-004417

(51) Int. Cl.$^7$ ............................................. B24B 57/02
(52) U.S. Cl. .................. 210/739; 210/143; 210/349; 156/345.15
(58) Field of Search ..................... 210/739, 96.1, 210/198.1, 205, 349; 156/345.12, 345.15, 156/345.18; 73/53.01, 61.41

(56) References Cited

U.S. PATENT DOCUMENTS

| | | | | |
|---|---|---|---|---|
| 5,674,410 | A | * | 10/1997 | Nakajima et al. .............. 216/92 |
| 6,001,215 | A | * | 12/1999 | Ban ........................ 156/345.15 |
| 6,013,156 | A | * | 1/2000 | Holbrook et al. ...... 156/345.15 |
| 6,106,728 | A | * | 8/2000 | Iida et al. .................... 210/743 |
| 6,358,125 | B2 | * | 3/2002 | Kawashima et al. .......... 451/60 |
| 6,391,145 | B1 | * | 5/2002 | Nishimoto et al. .... 156/345.12 |
| 2001/0037993 | A1 | * | 11/2001 | Iwasaki ....................... 216/13 |
| 2003/0111177 | A1 | * | 6/2003 | Park ....................... 156/345.22 |

FOREIGN PATENT DOCUMENTS

| | | | |
|---|---|---|---|
| JP | 2001-144058 A | * | 5/2001 |
| JP | 2001-260006 A | * | 9/2001 |

* cited by examiner

Primary Examiner—Frank M. Lawrence
(74) Attorney, Agent, or Firm—Nixon Peabody LLP; David S. Safran

(57) ABSTRACT

The method and apparatus are provided for preparing a slurry for a CMP apparatus with which mixing accuracy for a slurry is improved and accurate measurement is automatically accomplished for $H_2O_2$ as a small amount of additive. A slurry preparation apparatus for a CMP apparatus comprises a tank for preparing the slurry, a stock solution feeder for the slurry which feeds a stock solution for the slurry into the tank, and a concentration measurement instrument located outside the tank, which is capable of measuring an additive concentration in the slurry in the tank. The concentration measurement instrument measures the additive concentration in the slurry in the tank, and the amount of the stock solution for the slurry to be supplied is controlled according to the measurements.

3 Claims, 2 Drawing Sheets

METHOD AND APPARATUS FOR PREPARING SLURRY FOR CMP APPARATUS

BACKGROUND OF THE INVENTION

1. Field of the Invention

The present invention relates to a method and apparatus for preparing a slurry for a Chemical Mechanical Polishing (CMP) apparatus.

2. Description of the Related Art

As semiconductor integrated circuit design rules shrink, CMP has gained popularity in processes for planarizing layers such as interlayer films. Most of slurries used for CMP comprise a solid-liquid dispersion system in which fine particles are dispersed in an aqueous solution with reagents such as a pH adjuster. The slurries are available from a variety of slurry manufactures as a stock slurry solution in the form of liquid. A small amount (e.g., on the order of 2% by weight in the resultant solution) of hydrogen peroxide ($H_2O_2$) is a common additive for the stock slurry solution. Thus, the stock slurry solution and the additive and the like are materials for the slurry.

A common apparatus for preparing a slurry for a polishing apparatus is of a type shown in a cross-section in FIG. 2. The slurry preparation apparatus can also function as a slurry tank (slurry feeder) for supplying the slurry.

In FIG. 2, the slurry preparation apparatus 1 has pipes 2, 3 and 4 inserted into a bath through an upper lid. A pipe 5 is connected to the bottom of the bath. The pipe 2 is for supplying the stock slurry solution (as it is purchased from a manufacturer) and the pipe 3 for supplying an additive. The pipe 5 is for drawing and supplying the slurry to a slurry feeder, and the pipe 4 for returning the slurry back into the bath.

The pipes 4 and 5 are connected to a CMP apparatus, and used for supplying the slurry from the slurry feeder 1 to the CMP apparatus while circulating the slurry. A pipe 6 is connected between the pipes 4 and 5, and serves as a bypass between the pipes 4 and 5 that circulate the slurry between the slurry feeder 1 and the CMP apparatus. Additionally, a pump 7 and valves 8 and 9 are provided as auxiliary equipment.

The preparation of the slurry is accomplished by supplying the stock slurry solution and the additive through the pipes 2 and 3, respectively, and stirring them with a stirrer, not shown. Similarly, the stock slurry solution and the additive are supplied and stirred to prepare the slurry as it is lessened in the slurry feeder 1. In the operation, the amount of the stock slurry solution and the additive supplied are managed using level gauges (not shown) disposed within the slurry feeder 1.

In some instances, a slurry is not initially prepared in the slurry feeder 1 as described above, and an externally and separately prepared slurry is supplied. In this case, the pipe 2 and/or the pipe 3 are used only to add the stock slurry solution and/or additive.

In preparing a slurry in the above-described conventional slurry feeder 1, however, there arises a problem that the $H_2O_2$ concentration may decrease over time due to a resolution nature of $H_2O_2$, even though the initial amount of the stock slurry solution and additive, $H_2O_2$, supplied could accurately be managed. As a result, the mixture ratio varies and it would seriously affect a polishing quality.

To avoid the problem, it has been a common practice to regularly sample a slurry, measure the $H_2O_2$ concentration in the slurry, and feed the tank either with an additional slurry prepared in an external tank with higher $H_2O_2$ concentration than a baseline such that the current $H_2O_2$ concentration in the slurry can be corrected, or with a stock slurry solution and/or $H_2O_2$ using the pipe 2 and/or the pipe 3.

However, the conventional tasks above burden workers: the current amount of slurry and the $H_2O_2$ concentration in the slurry should be accurately obtained before an additional amount of slurry and the $H_2O_2$ concentration in the additional slurry are calculated, and an additional slurry needs to be prepared, or a stock slurry solution and/or $H_2O_2$ needs to be supplied using the pipe 2 and/or the pipe 3 according to the calculations. These require manual operation that is not suitable to a process control.

These also require facilities such as equipment for sampling, external tanks for an additional slurry, and the like.

SUMMARY OF THE INVENTION

The present invention has been made in view of these circumstances, and it is an object of the present invention to provide a method and apparatus for preparing a slurry for a CMP apparatus with which mixing accuracy for a slurry is improved and accurate measurement is automatically accomplished for $H_2O_2$ as a small amount of additive.

To attain the above-described object, the present invention is directed to an apparatus for preparing a slurry for a CMP apparatus, comprising: a tank for preparing the slurry; a stock solution feeder for the slurry which feeds a stock solution for the slurry into the tank; and a sensor which is located outside the tank and adapted to measure an additive concentration in the slurry in the tank, wherein the additive concentration in the slurry in the tank is measured by the sensor, and an amount of the stock solution for the slurry to be supplied is controlled according to the measured additive concentration.

Preferably, the sensor is supplied with the slurry through a pipe from the tank, and a damper device is provided upstream of the sensor to damp pulsation in a slurry flow. The reason for this is that by damping pulsation in a slurry flow upstream of the sensor in a slurry pipe, measurement accuracy for an additive concentration can be improved.

The present invention is also directed to a method for preparing a slurry for a CMP apparatus, comprising the steps of: measuring an additive concentration in the slurry in a tank for preparing the slurry with a sensor located outside the tank; and controlling an amount of a stock solution for the slurry to be supplied according to the measured additive concentration.

According to the present invention, an additive concentration in a slurry is measured by a sensor capable of measuring the additive concentration in the slurry in a tank for preparing the slurry, and the amount of stock slurry solution to be supplied is controlled according to the measurements. The present invention, therefore, provides for high mixing accuracy for a slurry, the additive concentration is automatically measured, and stock materials of the slurry are automatically supplied.

The term "stock materials of a slurry" as used herein includes a stock slurry solution available from a variety of slurry manufactures in the form of liquid, an additive, typically hydrogen peroxide ($H_2O_2$), and pure water added as required.

Although hydrogen peroxide ($H_2O_2$) is typical for an additive, other materials, such as urea peroxide, may be used.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a method and apparatus for preparing a slurry for a CMP apparatus according to the present invention will now be described with reference to the drawings.

Figure 1:
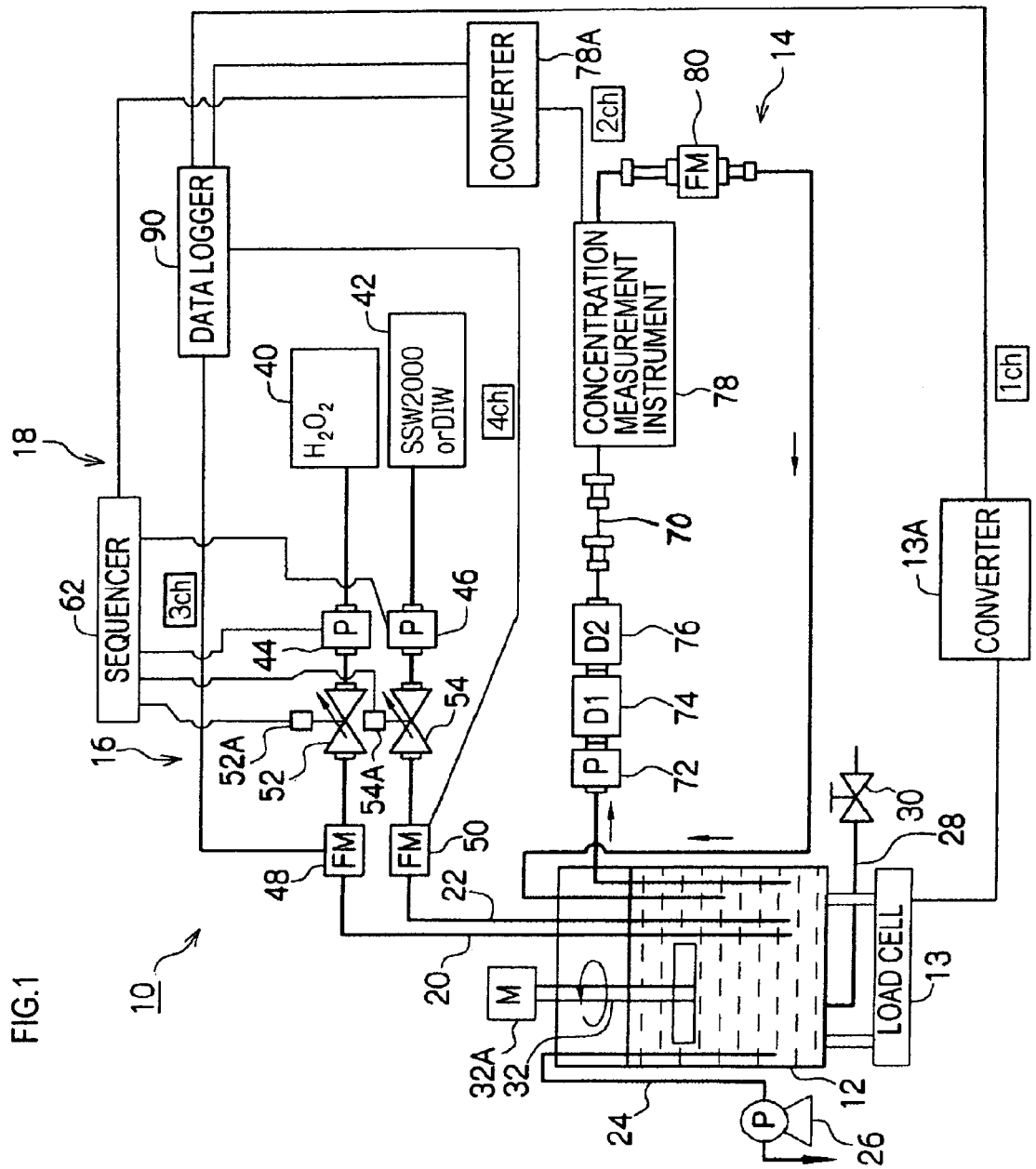
FIG. 1 shows a schematic view of the entire configuration of an apparatus for preparing a slurry according to the present invention.
Figure 2:
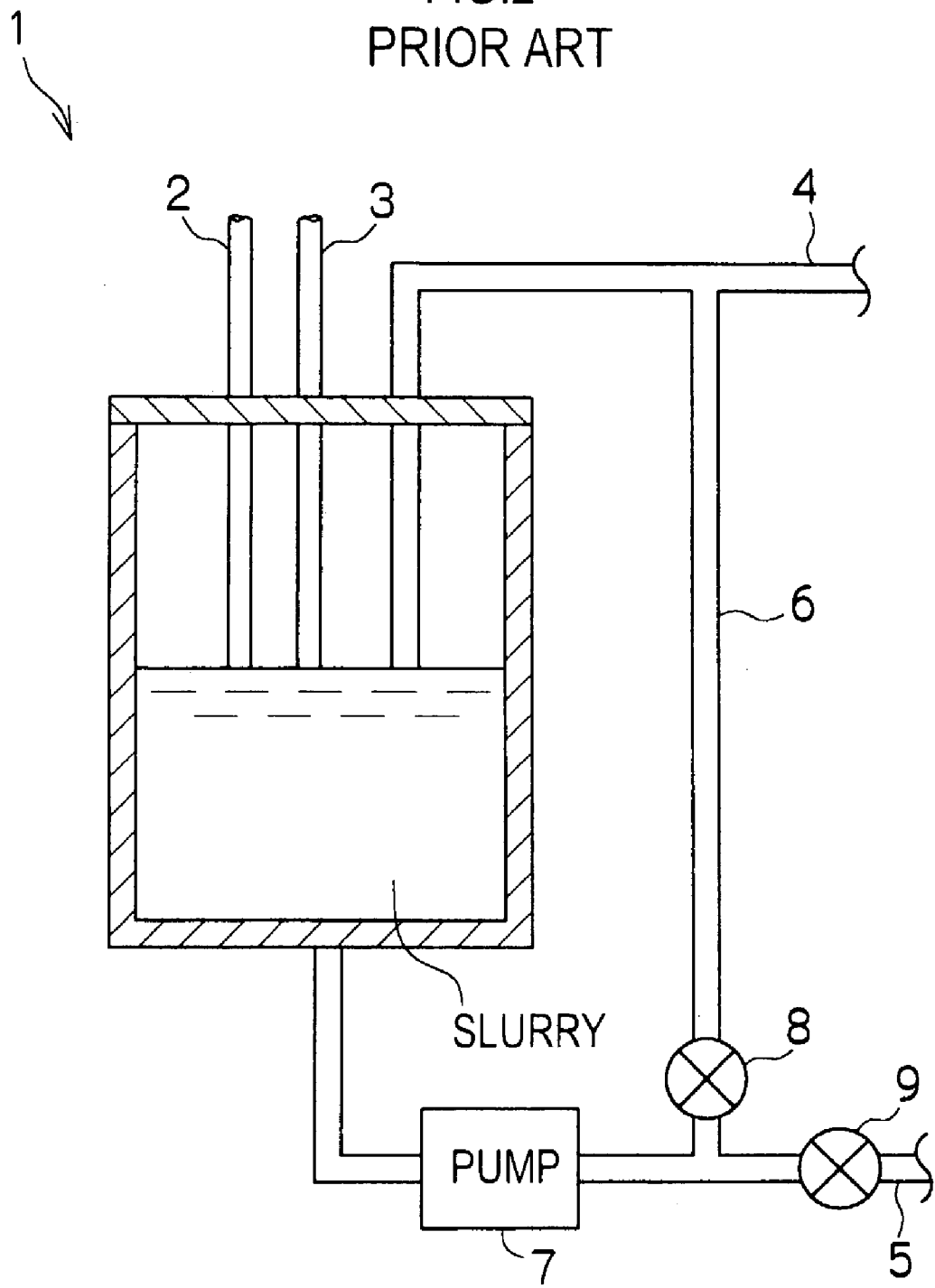
FIG. 2 shows a schematic sectional view of an example of a conventional apparatus for preparing a slurry.

FIG. 1 shows a schematic view of the entire configuration of a slurry preparation apparatus 10 according to the present invention. The slurry preparation apparatus 10 comprises a tank 12 for preparing a slurry, a measurement device for $H_2O_2$ concentration 14, a stock solution feeder 16 for a slurry, and a control device 18 for controlling the system.

The tank 12 for preparing the slurry is a cylindrical tank made of plastic and fixed on a load cell that is a weight sensor 13, so that the weight sensor 13 bears the entire weight of the tank 12.

Pipes 20 and 22 are in communication with inside of the tank 12 through an upper lid (not shown) thereof. A pipe 24 is also provided through the upper lid. The pipe 24 is connected to a pump 26 and routed to a polishing apparatus for drawing and supplying the slurry to the CMP apparatus. A pipe 28 is connected to the bottom of the tank 12, and a valve 30 located on the end of the pipe 28 can be operated to drain the content of the tank 12.

A pipe 70 is provided through a sidewall of the tank 12 and returns into the tank 12 through the upper lid via the measurement device for $H_2O_2$ concentration 14.

The tank 12 is provided with a stirrer 32 for stirring the content. Stirring with the stirrer 32 is accomplished by rotating blades located on the end of a shaft that is driven by a motor 32A.

These pipes 20, 22, 24, 28 and 70 as well as the stirrer 32 that are connected to the tank 12 are loosely connected thereto such that an error can not be introduced into a weight measurement by the weight sensor 13. Such a configuration may be obtained by using, for example, flexible tubes and the like.

Typically, the weight sensor 13 may preferably be a load cell, although it may be anything that can sense and extract as an electrical signal the weight of the tank 12 fixed thereon. Such a load cell that may be used includes, for example, the model TTS-100-1300-SW205 load cell (the model MX-8800 may be used as a controller 13A) from Technical & Try Inc. The indication of the load cell ranges from 0 to 15 kg, and 0 to 5000 mV can be obtained as an analog output.

The analog output from the controller (converter) 13A is sent to a computer (not shown). The analog output from the controller 13A is sent (via Channel 1) to and recorded on a data logger 90.

The measurement device for $H_2O_2$ concentration 14 comprises a pump 72, a first damper device 74, a second damper device 76, a sensor or $H_2O_2$ concentration measurement instrument 78, a flow meter 80, and the above-mentioned pipe 70 that is provided to connect the pump 72, the first damper device 74, the second damper device 76, the $H_2O_2$ concentration measurement instrument 78, and the flow meter 80 in line from the tank 12 and return to the tank 12.

In this configuration, a diaphragm pump is used as the liquid pump 72, although any other types of pumps that reliably transport the slurry solution may be used.

The first damper device 74 and the second damper device 76 may be any type capable of damping pulsation in a slurry flow due to the pump 72. Two dampers are arranged in line to enhance the effect; only a single damper may be provided according to a level of pulsation in a slurry and the damper device performance.

The $H_2O_2$ concentration measurement instrument 78 may be anything that can sense and extract as an electrical signal a $H_2O_2$ concentration in the slurry, and for example, a $H_2O_2$ concentration measurement instrument (FUD-1 model-11) from Fuji Engineering Co., Ltd. may be used. The indication of the instrument ranges from 0 to 5% by weight.

An output from the $H_2O_2$ concentration measurement instrument 78 (via Channel 2) is sent to a sequencer 62 through a converter 78A and the computer (not shown), as well as a data logger 90 on which it is recorded.

The flow meter 80 may be of a type that can visually be read such as a tapered tube flow meter, and preferably of a type that can extract measured values as an electrical signal, such as an electromagnetic flow meter.

The stock solution feeder 16 comprises stock solution tanks 40 and 42 for storing a stock slurry solution and an additive solution, etc. supplied to the tank 12, liquid pumps 44 and 46 for supplying the stock slurry solution and the additive solution from these tanks, flow meters 48 and 50, valves 52 and 54 that turn on/off the supply, and the above-mentioned pipes 20 and 22 that are provided to connect the liquid pumps 44 and 46, the flow meters 48 and 50, the valves 52 and 54 in line from the stock solution tanks 40 and 42 through the tank 12.

In this configuration, diaphragm pumps are used as the liquid pumps 44 and 46, although any other types of pumps that reliably transport the stock slurry solution and the additive solution, etc. may be used.

The flow meters 48 and 50 may be of a type that can visually be read such as a tapered tube flow meter, and preferably of a type that can extract measured values as an electrical signal, such as an electromagnetic flow meter. These outputs are sent through signal lines (Channel 3 and Channel 4) to the data logger 90 for storage, as described below.

The valves 52 and 54 are of a type that can turn on/off the supply as the control device 18 drives solenoids 52A and 54A, as described below.

The control device 18 comprises the computer (not shown) that controls the entire slurry preparation apparatus, the sequencer 62 that receives a command from the computer and controls the solenoids 52A and 54A that turns on/off the valves 52 and 54.

Additionally, the data logger 90 is provided to receive signals sent from the flow meters 48, 50 and the controller 13A of the weight sensor 13, as well as a signal sent from the $H_2O_2$ concentration measurement instrument 78 of the converter 78A, and record sequential measurements on the flow of the stock slurry solution and additives, etc. as well as the weight of the tank 12.

The valve 30 is provided to use in draining the content of the tank 12, etc. and the valve 30 can also be operated to draw a mixed slurry for such a task in which it may be monitored using a hydrometer of a float-type and the like.

The flow meters 48, 50 and the data logger 90 are not essential requirements for the present invention.

A method for preparing a slurry in the slurry preparation apparatus 10 configured as described above will now be described. A sequence in which a new slurry is prepared in an empty tank 12 is described here.

First, the weight sensor 13 measures the weight of the empty tank 12, and an output from the controller 13A of the weight sensor 13 is sent to the computer and stored thereon.

The liquid pump 44 is then driven, and the additive (hydrogen peroxide in this case) in the stock solution tank 40 is supplied into the tank 12. At this time, the valve 52 is in ON (opened) state. Upon the weight of the tank 12 reaches a predetermined weight value (the weight is determined by the computer), the computer controls the solenoid 52A via the sequencer 62, bringing the valve 52 into OFF (closed) state. This causes the additive solution ($H_2O_2$) supply to stop.

The liquid pump 46 is then driven, and a stock slurry solution (in this case, the solution is a colloidal silica from CABOT, the product number: SSW2000) in the stock solution tank 42 is supplied into the tank 12. At this time, the valve 54 is brought into ON (opened) state. Upon the weight of the tank 12 reaches a predetermined weight value (the weight is determined by the computer), the computer controls the solenoid 54A via the sequencer 62, bringing the valve 54 into OFF (closed) state. This causes the stock slurry solution supply to stop.

Simultaneously with the above operations, the supplied $H_2O_2$ and the stock slurry solution are stirred in the tank 12 by the stirrer 32 and uniformly mixed.

The data logger 90 receives signals sent from the flow meters 48, 50 and the controller 13A of the weight sensor 13, as well as a signal from the $H_2O_2$ concentration measurement instrument 78, and records sequential measurements on the flow of the stock slurry solution and $H_2O_2$, etc., the weight of the tank 12, and the $H_2O_2$ concentration, etc.

A method for replenishing $H_2O_2$ in the slurry preparation apparatus 10 will now be described. The pump 72 is continuously operated to avoid settling of the slurry in the pipe 70, or an error in the $H_2O_2$ concentration in measuring the $H_2O_2$ concentration. Alternatively, it may be started to operate at a predetermined time before each $H_2O_2$ concentration measurement in another embodiment.

The $H_2O_2$ concentration measurement using $H_2O_2$ concentration measurement instrument 78 may be carried out either continuously or periodically in a predetermined time interval. An embodiment in which the measurement is carried out periodically in a predetermined time interval will be described herein.

If a measurement of the $H_2O_2$ concentration from the $H_2O_2$ concentration measurement instrument 78 falls below a predetermined value of the lower limit, the sequencer 62 that is commanded by the computer drives the liquid pump 44 to supply $H_2O_2$ (hydrogen peroxide) in the stock solution tank 40 into the tank 12. At this time, the valve 52 is in ON (opened) state. Upon the $H_2O_2$ concentration in the slurry reaches a predetermined value (the $H_2O_2$ concentration is determined by the computer), the computer controls the solenoid 52A via the sequencer 62, bringing the valve 52 into OFF (closed) state. This causes the $H_2O_2$ supply to stop.

To accurately adjust the $H_2O_2$ concentration in the slurry, the volume of slurry to which $H_2O_2$ is supplied (added) must be known at this time. To this end, the weight sensor 13 measures the weight of the tank 12, the output from the controller 13A of the weight sensor 13 is sent to the computer and the amount of $H_2O_2$ to be supplied is calculated in consideration of the volume of slurry.

In case where $H_2O_2$ is continuously supplied, it is unavoidable that a time delay is introduced before the $H_2O_2$ concentration measurement instrument 78 measures the $H_2O_2$ concentration in the tank 12. Therefore, there is a certain time constant. A method may thus be adopted to intermittently supply $H_2O_2$, or a predetermined control method (for example, PID control) may be adopted.

If there is a small amount of slurry in the tank 12 in replenishing $H_2O_2$, the stock slurry solution may be supplied concurrent with the supply of $H_2O_2$. In this case, the procedure is similar to that for preparing an initial slurry.

The preferred embodiments of a method and apparatus for preparing a slurry for a CMP apparatus according to the present invention have been described. The present invention, however, is not limited to the illustrative embodiment described above, and various aspects may be implemented. For example, an example has been described for using hydrogen peroxide ($H_2O_2$) as an additive in the above embodiment, another embodiment may adopt other material, such as urea peroxide, may be used as an additive.

According to the present invention, an additive concentration in a slurry is measured by a sensor capable of measuring the additive concentration in the slurry in a tank for preparing the slurry, and the amount of stock slurry solution to be supplied is controlled according to the measurements, as described above. The present invention, therefore, provides for high mixing accuracy for a slurry, the additive concentration is automatically measured, and stock materials of the slurry are automatically supplied.

The sensor is supplied with a slurry through a pipe from the tank, and if a damper device is provided upstream of the sensor to damp pulsation in a slurry flow, it serves to damp pulsation in a slurry flow upstream of the sensor in a slurry pipe, improving measurement accuracy for an additive concentration.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An apparatus for preparing a slurry for a CMP apparatus, comprising:

a slurry tank for preparing the slurry;

a weight sensor adapted for measuring the weight of the slurry tank;

a stock solution feeder for the slurry which feeds a stock solution for the slurry into the slurry tank; and a concentration sensor which is located in a closed loop pipe having an inlet end for drawing the slurry from the slurry tank and an outlet end for returning the slurry back into the slurry tank, and which is outside the slurry tank and adapted to measure an additive concentration in the slurry in the tank, wherein the additive concentration in the slurry in the slurry tank is measured by the concentration sensor, the weight of the slurry tank is measured by the weight sensor and an amount of the stock solution for the slurry to be supplied is controlled according to the measured additive concentration and measured weight of the slurry tank.

2. The apparatus according to claim 1, wherein the concentration sensor is supplied with the slurry through a pipe from the tank, and a damper device is provided upstream of the concentration sensor to damp pulsation in a slurry flow.

3. A method for preparing a slurry for a CMP apparatus, comprising the steps of:

measuring the weight of a slurry tank for preparing the slurry with a weight sensor located on the slurry tank;

measuring an additive concentration in the slurry in a tank for preparing the slurry with a concentration sensor located in a closed loop pipe having an inlet end for drawing the slurry from the slurry tank and an outlet end for returning the slurry back into the slurry tank, and which is outside the tank; and controlling an amount of a stock solution for the slurry to be supplied according to the measured additive concentration.

* * * * *